United States Patent
Chang

(10) Patent No.: US 12,549,614 B2
(45) Date of Patent: Feb. 10, 2026

(54) VIDEO SHARING METHOD, APPARATUS, DEVICE AND MEDIUM

(71) Applicant: BEIJING ZITIAO NETWORK TECHNOLOGY CO., LTD., Beijing (CN)

(72) Inventor: Weiyi Chang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/540,818

(22) Filed: Dec. 2, 2021

(65) Prior Publication Data
US 2023/0007065 A1  Jan. 5, 2023

(30) Foreign Application Priority Data
Jul. 2, 2021  (CN) .......................... 202110754247.2

(51) Int. Cl.
*H04L 65/401* (2022.01)
(52) U.S. Cl.
CPC ................................ *H04L 65/4015* (2013.01)
(58) Field of Classification Search
CPC ............ H04L 65/4015; H04L 65/1089; H04L 65/1059; H04L 65/402; H04N 7/147; H04N 7/141; H04N 21/4316; H04N 21/4788; H04N 21/4858
See application file for complete search history.

(56) References Cited

U.S. PATENT DOCUMENTS

| | | |
|---|---|---|
| 10,681,300 B1 | 6/2020 | Meccarelli et al. |
| 11,079,995 B1 * | 8/2021 | Hulbert ............... G06F 3/04845 |
| 2009/0086013 A1 * | 4/2009 | Thapa ...................... H04N 7/15 |
| | | 348/E7.083 |

(Continued)

FOREIGN PATENT DOCUMENTS

| | | |
|---|---|---|
| CN | 101035248 A | 9/2007 |
| CN | 102209273 A | 10/2011 |

(Continued)

OTHER PUBLICATIONS

International Search Report and Written Opinion issued Jul. 29, 2022 in International Patent Application No. PCT/CN2022/091829, with partial English translation (7 pages).

(Continued)

*Primary Examiner* — Lesa M Kennedy

(57) ABSTRACT

The present disclosure relates to a video sharing method, apparatus, device and medium. Wherein, the video sharing method is used for an electronic device of a first user, comprising: displaying a target call interface, the target call interface being used to make a real-time call between the first user and at least one second user; when a video sharing event is triggered, the target call Interface is switched to be displayed as a target sharing interface, the target sharing interface being used to display a first video shared between the first user and the at least one second user and to keep the real-time call between the first user and the at least one second user. According to an embodiment of the present disclosure, it enables the first user and the second user to watch the first video synchronously, and realize sharing of the first video.

18 Claims, 8 Drawing Sheets

(56) References Cited

U.S. PATENT DOCUMENTS

| | | |
|---|---|---|
| 2009/0249225 A1 | 10/2009 | Beswick et al. |
| 2011/0246908 A1 | 10/2011 | Akram et al. |
| 2012/0296972 A1 | 11/2012 | Backer |
| 2013/0103814 A1 | 4/2013 | Carrasco et al. |
| 2013/0307920 A1 | 11/2013 | Cahill et al. |
| 2013/0339452 A1 | 12/2013 | Shaikh et al. |
| 2015/0046834 A1 | 2/2015 | Wu et al. |
| 2016/0072861 A1 | 3/2016 | Woolsey et al. |
| 2016/0142450 A1* | 5/2016 | Paul ................ H04L 67/02 715/753 |
| 2016/0231888 A1 | 8/2016 | Govindraj |
| 2017/0371501 A1 | 12/2017 | Wang |
| 2018/0196583 A1 | 7/2018 | Astavans et al. |
| 2018/0316939 A1 | 11/2018 | Todd |
| 2019/0028667 A1 | 1/2019 | Faulkner |
| 2020/0186648 A1* | 6/2020 | Schwarz ........... H04M 3/5183 |
| 2020/0301648 A1 | 9/2020 | Shi et al. |
| 2022/0365739 A1* | 11/2022 | Chang ............... H04L 51/066 |
| 2022/0374136 A1* | 11/2022 | Chang .............. G06F 3/04845 |
| 2022/0391158 A1* | 12/2022 | Lemmens ........... G06F 3/1454 |
| 2023/0126656 A1* | 4/2023 | Lu ..................... H04N 21/431 348/14.03 |

FOREIGN PATENT DOCUMENTS

| | | |
|---|---|---|
| CN | 103517029 A | 1/2014 |
| CN | 104125476 A | 10/2014 |
| CN | 104238949 A | 12/2014 |
| CN | 104780336 A | 7/2015 |
| CN | 104918127 A | 9/2015 |
| CN | 105898456 A | 8/2016 |
| CN | 106254784 A | 12/2016 |
| CN | 107864358 A | 3/2018 |
| CN | 108933965 A | 12/2018 |
| CN | 109089059 A | 12/2018 |
| CN | 109408168 A | 3/2019 |
| CN | 110290425 A | 9/2019 |
| CN | 111464761 A | 7/2020 |
| CN | 111629151 A | 9/2020 |
| CN | 112351349 A | 2/2021 |
| CN | 112492363 A | 3/2021 |
| CN | 306359424 S | 3/2021 |
| CN | 112601119 A | 4/2021 |
| CN | 112751744 A | 5/2021 |
| CN | 112911368 A | 6/2021 |
| CN | 113489937 A | 10/2021 |
| EP | 1804455 A1 * | 7/2007 ......... H04L 65/1006 |
| JP | 2016066998 A | 4/2016 |
| JP | 2017532645 A | 11/2017 |
| WO | 0125940 A1 | 4/2001 |
| WO | WO2012134150 A2 | 10/2012 |
| WO | 2014120803 A1 | 8/2014 |
| WO | 2014176907 A1 | 11/2014 |
| WO | 2017084325 A1 | 5/2017 |
| WO | 2019105390 A1 | 6/2019 |
| WO | 2019/128249 A1 | 7/2019 |

OTHER PUBLICATIONS

First Office Action issued Aug. 3, 2022 in Chinese Patent Application No. 202110754247.2 (7 pages) with an English translation (4 pages).

Anonymous, "Meeting Room Basics", The Wayback Machine, Retrieved from the link: "L:https://web.archive.org/web/20200825024034/https://it.tufts.edu/book/export/html/1762", pp. 1-6.

European Search Report for EP Patent Application No. 22832166.7, Issued on Sep. 27, 2024, 9 pages.

Notice of Allowance for Japanese Application No. 2023-580491, mailed Oct. 29, 2024, 6 pages.

Communication Pursuant to Rules 70(2) and 70a(2) EPC for European Application No. 22832166.7, mailed Oct. 15, 2024, 1 page.

European Office Action for EP Patent Application No. 22832166.7, Issued on Jun. 13, 2025, 8 pages.

Surya, "Tutorial Video Call WhatsApp", Youtube, Retrieved from the link: "https://www.youtube.com/watch?v=GsDBhOXpBns", 2016, pp. 1-2.

Ben Finio: "Zoom Side by Side Mode", Youtube, Retrieved from the link: "https://www.youtube.com/watch? v=5xNom7S3ffs", Jun. 2020, pp. 1-2.

Chris Menard., "Zoom Meetings: Share a Video with Audio (sound) by Chris Menard", Youtube, Retrieved from the link: "https://www.youtube.com/watch?v=BHi7QmsrjYY", Apr. 2020, pp. 1-2.

Office Action received for European Application No. 22832166.7, mailed on Nov. 20, 2025, 10 pages.

* cited by examiner

VIDEO SHARING METHOD, APPARATUS, DEVICE AND MEDIUM

CROSS-REFERENCE TO RELATED APPLICATIONS

The present disclosure is based on and claims priority to China Patent Application No. 202110754247.2 filed on Jul. 2, 2021, the disclosure of which is incorporated by reference herein in its entirety.

TECHNICAL FIELD

The present disclosure relates to the field of Internet technology, and in particular to a video sharing method, apparatus, equipment, and medium.

BACKGROUND

With the rapid development of computer technology and mobile communication technology, various video platforms based on electronic devices have been widely used, greatly enriching people's daily lives.

SUMMARY

The present disclosure provides a video sharing method, apparatus, device, and medium.

In a first aspect, the present disclosure provides a video sharing method used for a first user's electronic device, comprising:
  displaying a target call interface, wherein the target call interface is used to make a real-time call between the first user and at least one second user;
  When a video sharing event is triggered, the target call interface is switched to be displayed as a target sharing interface, the target sharing interface being used to display a first video shared between the first user and the at least one second user and to keep the real-time call between the first user and the at least one second user.

In a second aspect, the present disclosure provides a video sharing apparatus used for a first user's electronic device, comprising:
  a first display unit configured to display a target call interface, wherein the target call interface is used by the first user to make a real-time call with at least one second user;
  a second display unit configured to switch the target call interface to be display as a target sharing interface when a video sharing event is triggered, the target sharing interface being used to display a first video shared between the first user and the at least one second user and to keep the real-time call between the first user and the at least one second user.

In a third aspect, the present disclosure provides an electronic device, comprising:
  a processor;
  a memory, used to store an executable instruction;
  wherein, the processor is configured to read the executable instruction from the memory and execute the executable instruction to implement the video sharing method described in the first aspect.

In a fourth aspect, the present disclosure provides a computer-readable storage medium having a computer program stored thereon, which, when executed by a processor, causes the processor to implement the video sharing method described in the first aspect.

Compared with the prior art, the technical solutions provided by embodiments of the present disclosure have the following advantages:

The video sharing method, apparatus, device and medium of embodiments of the present disclosure can replace a target call interface with a target sharing interface when a video sharing event is triggered during a real-time call between a first user and a second user, so that the target sharing interface can be used to display a first video shared between the first user and at least one second user, so that the first user and the second user can watch the first video synchronously, so as to realize the sharing of the first video, and the target sharing interface can also be used to maintain the real-time call between the first user and the at least one second user. The first user and the second user can still communicate their own viewing experience in real time while simultaneously watching the first video, so as to make the first user and the second user have the experience of watching the first video face to face, which improves the user's experience of real-time call and video sharing.

BRIEF DESCRIPTION OF THE DRAWINGS

The above and other features, advantages, and aspects of embodiments of the present disclosure will become more apparent in conjunction with the accompanying drawings and with reference to the following detailed description. Throughout the drawings, the like or similar reference signs indicate the like or similar elements. It should be understood that the drawings are schematic and the originals and elements are not necessarily drawn to scale.

DETAILED DESCRIPTION

Figure 1:
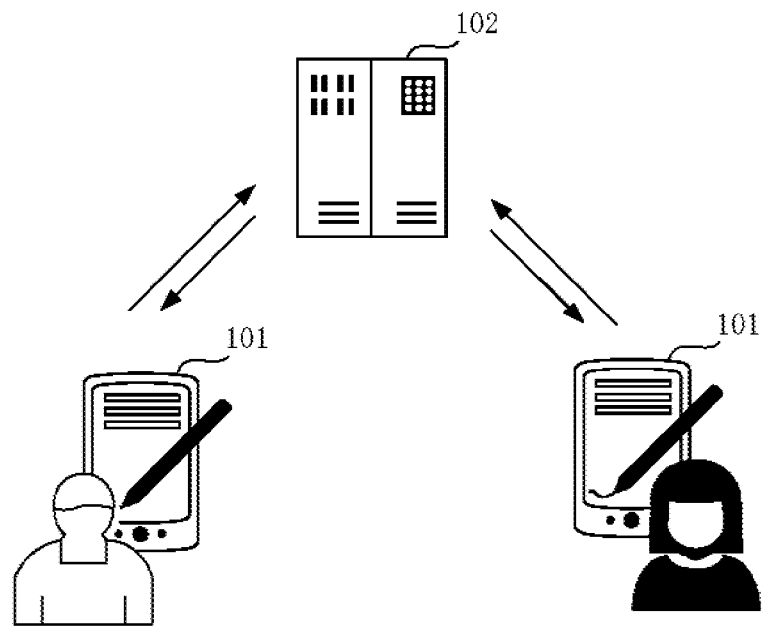
FIG. 1 is an architecture diagram of a video sharing provided by an embodiment of the present disclosure.

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that the drawings and embodiments of the present disclosure should be explained as merely illustrative, and not as a limitation to the protection scope of the present disclosure.

It should be understood that various steps recited in the method embodiments of the present disclosure can be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description.

It should be noted that the concepts of "first" and "second" etc. mentioned in the present disclosure are only used to distinguish between different apparatus, modules or units, and are not used to limit the order of functions performed by these apparatus, modules or units or their interdependence.

It should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustration, and are not used to limit the scope of these messages or information.

FIG. 1 shows an architecture diagram of video sharing provided by an embodiment of the present disclosure.

As shown in FIG. 1, the architecture diagram may include at least two electronic devices 101 on a client side and at least one server 102 on a server side. The electronic devices 101 may respectively establish a connection with the server 102 and perform information exchange through a network protocol such as Hyper Text Transfer Protocol over Secure Socket Layer (HTTPS). Wherein, the electronic device can be a device with communication function, such as a mobile phone, a tablet, a desktop computer, a notebook, a vehicle-mounted terminal, a wearable device, an all-in-one machine, a smart home appliance, and the like. The server 102 may be a device with storage and computing functions, such as a cloud server or a server cluster.

Based on the foregoing architecture, users who use the electronic device 101 can communicate in real time through a designated network platform installed on the electronic device 101. Wherein, the designated network platform can be a designated website or a designated application program. The server 102 can provide support for the designated network platform.

In the prior art, when a user is in a call, it is impossible to share videos with friends. In the embodiment shown in the present disclosure, during the user's real-time call, when the electronic device 101 detects that a video sharing event is triggered, the electronic device 101 can replace the call interface with a sharing interface, and display a shared video in the sharing interface. Therefore, each user of the real-time call can simultaneously watch the shared video displayed on the sharing interface, so as to realize the sharing of the shared video among individual users of the real-time call, thereby improving the user's experience of real-time call and video sharing.

In some embodiments of the present disclosure, when the electronic device 101 detects a first trigger operation of a first user on a call interface for triggering video sharing, the electronic device 101 can determine that it is detected that the video sharing event is triggered. At this time, the electronic device 101 that detects the first trigger operation can share a video data stream of the shared video to other electronic devices 101 through a server 102, so that the other electronic devices 101 can synchronously replace the call interface with a sharing interface.

In some other embodiments of the present disclosure, when the electronic device 101 receives a video data stream of a shared video sent to it by other electronic device 101 through the server 102, the electronic device 101 can determine that it is detected that a video sharing event is triggered. At this time, the electronic device 101 can replace the call interface with a shared interface in synchronization with other electronic devices 101.

Therefore, in the embodiments of the present disclosure, the sharing of a shared video can be realized by the server in a way of sending a video data stream of the shared video, while the interactive data will be pulled separately according to operation status of individual user on the shared video, so that a user cannot watch interactive situations of other users, who are watching the shared video simultaneously, on the shared video, which can protect the user's privacy during the video sharing process.

According to the foregoing architecture, the video sharing method provided by the embodiments of the present disclosure will be described below in conjunction with FIG. 2 to FIG. 13.

In an embodiment of the present disclosure, the video sharing method can be executed by an electronic device. For example, the electronic device can be the electronic device 101 in the client shown in FIG. 1, where the electronic device can be a device with communication function, such as a mobile phone, a tablet, a desktop computer, a notebook, a vehicle-mounted terminal, a wearable device, an all-in-one machine, a smart home appliance, and other devices.

Figure 2:
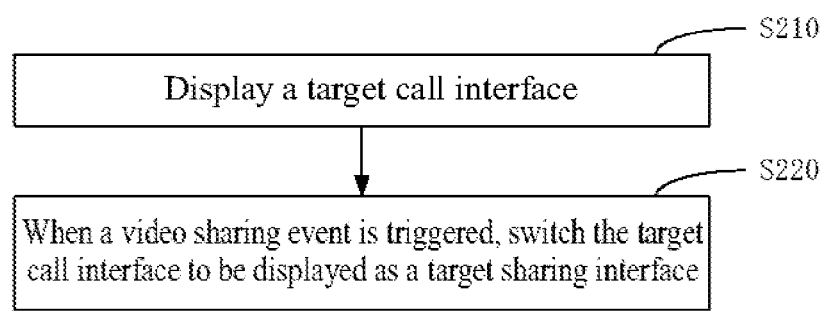
FIG. 2 is a schematic flowchart of a video sharing method provided by an embodiment of the present disclosure.

FIG. 2 shows a schematic flowchart of a video sharing method provided by an embodiment of the present disclosure.

As shown in FIG. 2, the video sharing method may include following steps.

S210: display a target call interface.

In an embodiment of the present disclosure, a target call interface can be used for making a real-time call between a first user and at least one second user, that is, the first user and the second user can realize a real-time call through the target call interface.

Specifically, an electronic device of the first user can interact with an electronic device of the at least one second user to realize a real-time call between the first user and the at least one second user, and the electronic device of the first user can display the target call interface for real-time calls.

Accordingly, while the electronic device of the first user displays the target call interface, the electronic device of the second user who is in a real-time call with the first user can also display a call interface similar to the target call interface, and contents displayed on the call interface can be differences depending on users.

Optionally, the target call interface can be a voice call interface or a video call interface, which is not limited here.

Optionally, the target call interface can be a call interface displayed when a real-time call is made using an instant communication platform such as an instant messaging application etc., or a call interface displayed when a real-time call is made using the communication function of an operator, which has no limitations here.

In an embodiment of the present disclosure, the target call interface may include relevant information of the first user and the second user. For example, the target call interface may include at least one of real-time pictures, user avatars, etc. of the first user and the second user.

In some embodiments, an electronic device of the first user can display the target call interface after receiving a call initiation operation input by the first user for initiating a real-time call with at least one second user. In other embodiments, the electronic device of the first user can also display the target call interface after receiving a request through it for a real-time call initiated by any second user.

Wherein, the call initiation operation can be, without limitations here, a gesture control operation (such as tap, long press, double tap, etc.), a voice control operation, or an expression control operation, etc., on a call initiation control used to trigger a request to initiate a real-time call to at least one second user.

Figure 3:
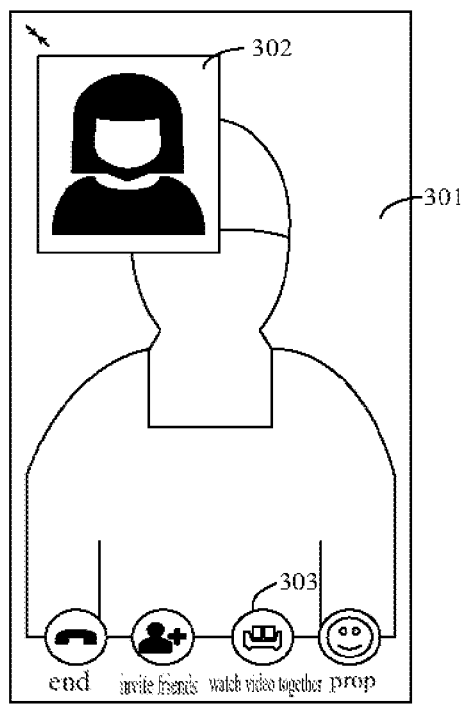
FIG. 3 is a schematic diagram of a call interface provided by an embodiment of the present disclosure.

Illustratively, FIG. 3 shows a schematic diagram of a call interface provided by an embodiment of the present disclosure. As shown in FIG. 3, the electronic device can display a call interface, in which a real-time picture 301 of a first user and a real-time picture 302 of a second user, who are in a real-time video call, can be displayed. The real-time screen 301 of the first user in the figure can be displayed in a full screen, and the real-time screen 302 of the second user can be displayed in the form of a small window.

It is understood that the call interface in the electronic device of the second user who is in a real-time call with the first user in FIG. 3 can also display real-time pictures of the first user and the second user. The difference is that the real-time picture of the second user can be displayed in full screen, and the real-time picture of the first user can be displayed in the form of a small window.

S220: When a video sharing event is triggered, switch the target call interface to be displayed as a target sharing interface.

In an embodiment of the present disclosure, a target sharing interface can be used to display a first video shared between a first user and at least one second user and to keep a real-time call between the first user and the at least one second user. That is, after an electronic device of the first user is switched to the target sharing interface, the shared first video can be displayed while keeping the real-time call with the second user through the target sharing interface.

In an embodiment of the present disclosure, the electronic device of the first user can detect a video sharing event in real time during the process of displaying the target call interface, and when it detects that the video sharing event is triggered, it can switch the target call interface currently displayed to a target sharing interface, and display a first video for sharing between the first user and at least one second user in the target sharing interface, and keep the ongoing real-time call through the target sharing interface.

Accordingly, while the electronic device of the first user is switched to be displayed as the target sharing interface, an electronic device of the second user who is in a real-time call with the first user can also switch the call interface currently displayed to a shared interface, and display the first video on the shared interface. The sharing interface has the same functions and displayed the same video as the abovementioned target sharing interface, and other information may differ depending on users.

In this embodiment, a video screen synchronized with the electronic device of the second user is displayed in the target sharing interface. That is, the video screen of the first video displayed in the target sharing interface can be displayed on the electronic device of the second user synchronously, which improves the experience of the first user and the second user watching the video synchronously.

As such, by introducing the function of watching videos together during a real-time call between multiple users, the shared video can be watched simultaneously, which enriches the user experience during the call, and increases interaction time and depth of interaction between different users.

In some embodiments, the target sharing interface may also be used to display call controls, and the call controls may include a call window for the first user and a call window for the second user.

Wherein, the call control can be a functional control used to characterize the real-time call process. The display parameters of the call control in the target sharing interface can be set according to actual conditions, and the display parameters can include display position and display size. The call control can include the call windows for the first user and at least one second user who are in a real-time call. Each call window corresponding to one user. The call window can display relevant information of the corresponding user. For example, the call window can display a real-time screen or user avatar and the like of corresponding user.

Optionally, the number of users in a real-time call in this embodiment can be set to a number threshold, that is, only support real-time calls between multiple users within the number threshold. For example, a maximum of 6 users are supported in a real-time call.

Figure 4:
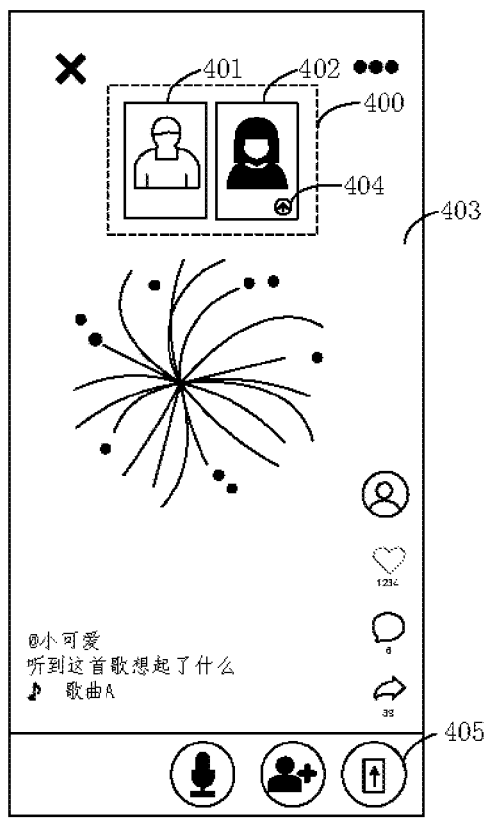
FIG. 4 is a schematic diagram of a first sharing interface provided by an embodiment of the present disclosure.

Illustratively, FIG. 4 shows a schematic diagram of a first sharing interface provided by an embodiment of the present disclosure. As shown in FIG. 4, it shows a sharing interface displayed in an electronic device of a first user, and the sharing interface can display a call control 400 and a first video 403 shared between the first user and a second user. The call control 400 can be displayed in a call window 401 of the first user and a call window 402 of the second user who are making a real-time video call. The real-time picture of the user can be displayed in the call window 401 and the call window 402.

Optionally, interactive controls of the first video may also be displayed in the target sharing interface. The interactive controls can be used to display interactive data, and the interactive data may include data such as comments, forwards, and likes, etc.

Specifically, the first video can be displayed within a video layer of the sharing interface, and a control layer may be superimposed on the video layer, and the aforementioned interactive controls can be displayed within the control layer. When the first user shares the first video with the second user, a server may also query first interactive data of the first video, and send the first interactive data of the first video to the electronic device of the second user, so that after receiving the first interactive data of the first video, the electronic device of the second user displays it on the interactive control. Moreover, when the second user shares the first interactive data of the first video with the first user, the electronic device of the first user can also receive the first interactive data of the first video sent by the server and display it on the interactive control.

As shown in FIG. 4, the first video 403 is a video posted by a user, and interactive controls of the first video 403 are also displayed in the sharing interface, and interactive data is displayed in the interactive controls. As shown in the figure, the number of likes is 1234, and the number of comments is 6, and the number of forwards is 89.

In other embodiments, the display size of the call control in the target sharing interface may also be related to the number of call windows in the call control.

Optionally, the display size of the call control can be determined according to the number of call windows in the call control, and/or the number of call windows is determined according to the number of users in a real-time call.

Since one call window corresponds to one user in a real-time call, the number of call windows is equal to the number of users in the real-time call.

Optionally, the display size of the call control can be reduced as the number of call windows increases, and the display size can be reduced gradually in proportion; two different display sizes can also be set. When the number of call windows is less than a first preset number, the call control can be displayed in a smaller display size, when the number of call windows is greater than or equal to the first preset number, the call control can be displayed in a larger display size, and the preset number can be set as needed, for example the preset number can be 4.

Optionally, the content displayed in the call window can also be determined according to the number of call windows. When the number of call windows in the call control is less than a second preset number, the real-time picture can be displayed in the call window; when the number of call windows in the call control is greater than or equal to the second preset number, the user avatar can be displayed in the call window.

Figure 5:
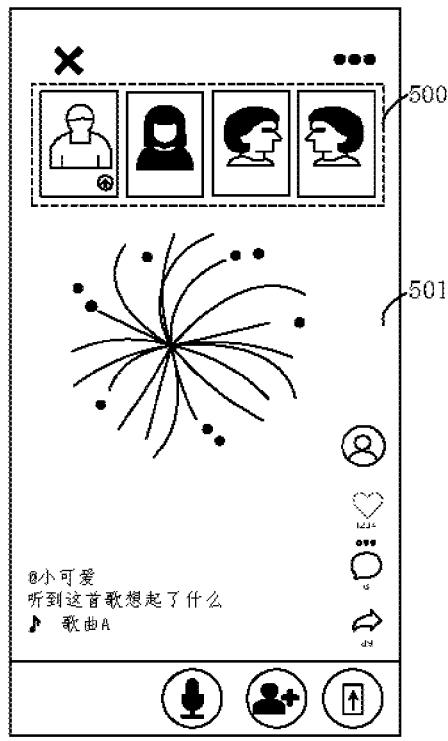
FIG. 5 is a schematic diagram of a second sharing interface provided by an embodiment of the present disclosure.
Figure 6:
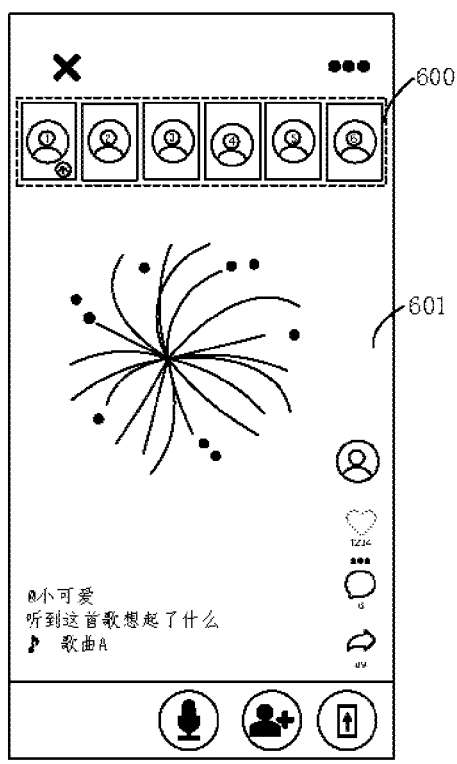
FIG. 6 is a schematic diagram of a third sharing interface provided by an embodiment of the present disclosure.

Illustratively, FIG. 5 shows a schematic diagram of a second sharing interface provided by an embodiment of the present disclosure, and FIG. 6 shows a schematic diagram of a third sharing interface provided by an embodiment of the present disclosure. With reference to FIG. 4 to FIG. 6, initially, as shown in FIG. 4, there are two users making a real-time call, and the number of call windows in the call control 400 is 2; then as shown in FIG. 5, two users have joined the real-time call, and the number of call windows in the call control 500 is 4; further as shown in FIG. 6, two more users have joined the real-time call, and the number of call windows in the call control 600 is 6, and the first video 501 shared between the first user and the second user shown in FIG. 5 and the first video 601 shown in FIG. 6 is the same. From above, as the number of users in the real-time call increases, the number of call windows also increases, and the display size of the call control becomes gradually smaller. As shown in FIG. 5, when the number of call windows is 4, the real-time picture of corresponding user is displayed in a larger size in individual call windows. As shown in FIG. 6, when the number of call windows is 6, that is, greater than 4, the user avatar of corresponding user is displayed in a smaller size in individual call windows.

In still other embodiments, a sharing mark is displayed on the target call window in the call control, and the target call window is the call window for the user who is sharing the video. The sharing mark can be an indicative frame added to the call window, or a mark added to a corner of the call window, or a mark added to a preset position in the call window, which can be set as desired.

In this embodiment, in addition to displaying the call control, the target sharing interface can also display a sharing mark in the call window for the user who is sharing the video in the call control, which is used to highlight the difference between the user and other users, so that respective users who are in real-time call have knowledge about the user who is sharing the video, thereby improving video sharing experience.

Referring to the sharing interface shown in FIG. 4 above, in the call control, a sharing mark 404 is displayed in the call window for the user who is sharing the video, for highlighting the video currently being shared by the user. FIG. 5 and FIG. 6 also show a sharing mark, the difference is that the displayed call window is different.

In an embodiment of the present disclosure, a target call interface can be replaced with a target sharing interface when a video sharing event is triggered during a real-time call between a first user and a second user, so that the target sharing interface can be used to display a first video shared between the first user and at least one second user, so that the first user and the second user can watch the first video synchronously, so as to realize the sharing of the first video, and the target sharing interface can also be used to maintain the real-time call between the first user and the at least one second user, and can still communicate their own viewing experience in real time while simultaneously watching the first video, so as to make the first user and the second user have the experience of watching the first video face to face, which improves the user's experience of real-time call and video sharing.

In another embodiment of the present disclosure, a video sharing event may be a trigger event used to realize video sharing between two users who are in a real-time call. The video sharing event may be triggered by a first user or by a second user who is in a real-time call with the first user. In addition, the first video may be a video shared by a first user or a second user who is in a real-time call with the first user.

In some embodiments, a video sharing event being triggered can include: when a first trigger operation on a target call interface is detected, the video sharing event is triggered. At this time, the first video is a video shared by the first user to at least one second user.

Wherein, the first trigger operation may be an operation used by the first user to trigger a video sharing event, and may specifically include, without limitations here, a gesture control operation (such as tap, long press, double tap, etc.), a voice control operation, or an expression control operation, etc., by the first user in a target call interface.

Illustratively, referring to FIG. 3, the first trigger operation can be the trigger operation on the control 303 for "watching video together" by the first user, which is only an example. When the video sharing event is triggered by the first user, the first video may be a video shared by the first user to at least one second user through a sharing operation.

In these embodiments, the electronic device of the first user can detect the operation of the first user during the process of displaying the target call interface, and when the first trigger operation of the first user on the target call interface is detected, the video sharing event can be determined to be triggered. In one example, the electronic device of the first user can display multiple candidate videos, and the first user may perform a choose operation among the displayed multiple candidate videos, so that the electronic device of the first user selects the video chosen by the first user as the first video. In another example, after determining that a video sharing event is triggered, the electronic device of the first user may also use the video being watched by the first user as the first video.

Further, the electronic device of the first user can share the first video to the electronic device of at least one second user through a server, so that the electronic device of the first user and the electronic device of the second user both switch to display a sharing interface and display the above-mentioned first video in the sharing interface. The above-mentioned sharing process of the first video may include: the electronic device of the first user sends a sharing request to the server, the sharing request carrying information such as a video identification or a video address of the first video, and the server searches for a first video data stream of the first video stored locally based on the information such as the video identification or the video address of the first video, in responds to the sharing request, and pushes the first video data stream to the electronic device of the second user, so that the electronic device of the second user receives the first video data stream of the first video, and the electronic device of the second user can switch the call interface to the sharing interface in response to the first video data stream of the first video.

In some other embodiments, a video sharing event being triggered may include: when a first video data stream of a first video is received, the video sharing event is triggered. At this time, the first video is a video shared by a second user to the first user.

Wherein, the first video data stream of the first video may be a video data stream sent by an electronic device of any second user to an electronic device of the first user through a server. When the electronic device of the first user receives the first video data stream of the first video sent by the electronic device of any second user through the server, it can be determined that a video sharing event is triggered. At this time, the first video can be a video shared by the second user to the first user through the server.

Specifically, after the electronic device of the first user displays a target call interface, the electronic device of the second user also displays the call interface at the same time. When the electronic device of the second user detects that a video sharing event is triggered based on a trigger operation of the second user, the electronic device of the second user may use the candidate video chosen by the second user from multiple candidate videos as the first video, according to a choose operation of the second user, or use the video currently being watched by the second user as the first video.

Further, the electronic device of the second user can share the first video to the electronic device of the first user through the server, so that the electronic device of the first user and the electronic device of the second user both switch to display a sharing interface and display the above-mentioned first video in the sharing interface. The above-mentioned sharing process of the first video may include: the electronic device of the second user sends a sharing request to the server, the sharing request carrying information such as a video identification or a video address of the first video, and the server searches for a first video data stream of the first video stored locally based on the information such as the video identification or the video address of the first video, in responds to the sharing request, and pushes the first video data stream to the electronic device of the first user, so that the electronic device of the first user receives the first video data stream of the first video.

Optionally, after receiving the first video data stream of the first video, the electronic device of the first user may determine whether a target sharing interface for sharing a video is currently displayed, and if it is, then the first video is displayed in the target sharing interface; if not, then the target call interface is switched to be displayed as the target sharing interface, and the first video is displayed in the target sharing interface.

Therefore, in the embodiments of the present disclosure, video sharing can be triggered by any one of multiple users who are in a real-time call and the video to be shared can be shared with other users, so that multiple users can watch the shared video synchronously, thereby achieving video sharing.

In yet another embodiment of the present disclosure, after a target call interface being switched to be displayed as a target sharing interface, the electronic device of the first user may also replace the first video displayed in the target sharing interface with another video based on a trigger by the first user or the second user, thereby achieving switching of a shared video.

In some embodiments, after switching the target call interface to be displayed as the target sharing interface, the video sharing method can further include: when a second video data stream of a second video is received, replacing the first video to be displayed as the second video; where the second video is a video shared to the first user by the second user in the process of displaying the first video in the target sharing interface.

Wherein, the second video data stream of the second video can be a video data stream sent by an electronic device of any second user to an electronic device of the first user through a server in the process of displaying the first video in the target sharing interface. When the electronic device of first user receives the second video data stream of the second video sent by the electronic device of any second user through the server, it can determine to trigger a switching event for the currently shared first video. At this time, the second video may be another video shared to the first user by the second user in the process of displaying the first video through the server.

Specifically, after the electronic device of the first user switches the target call interface to be displayed as the target sharing interface, the electronic device of the second user also displays the sharing interface at the same time, and after the electronic device of the second user detects that the second user triggers a video sharing event for the second video, the electronic device of the second user may use the candidate video chosen by the second user from multiple candidate videos as the second video, according to a choose operation of the second user. After that, the electronic device of the second user sends a sharing request to a server, the sharing request carrying information such as an video identification or a video address of the second video. In response to the sharing request, the server searches for a second video data stream of the second video stored locally based on information such as the video identification or the video address of the second video, and pushes the second video data stream to the electronic device of the first user, so that the electronic device of the first user receives the second video data stream of the second video.

Further, after the electronic device of the first user receives the second video data stream, the first video displayed in the target sharing interface can be replaced with the second video, so that the electronic device of the first user and the electronic device of the second user both switch the first video displayed in the sharing interface to the second video.

Optionally, when the electronic device of the first user receives the second video data stream of the second video, it can determine whether a sharing interface for sharing a video is currently displayed, and if it is, it directly replaces the first video with the second video; if not, the sharing interface will be displayed, and the second video will be displayed in the sharing interface.

Optionally, when the electronic device of the first user receives the second video data stream of the second video, it can also determine whether there is currently an interactive operation for the first video, if it is, then the first video is replaced with the second video when it is detected that the interactive operation is finished; otherwise, the first video is replaced with the second video.

Specifically, when the electronic device of the first user receives the second video data stream of the second video, it can determine whether the first user is conducting an interactive operation for the first video, if it is, the video will not be replaced at first, and the first video will not be replaced with the second video until the interactive operation is finished; if not, the video will be replaced directly.

Therefore, in the embodiment of the present disclosure, it may increase the judgment of the interactive operation before switching the shared video displayed in the sharing interface, and switch the video after the interactive operation, so as to avoid the impact on the user's interactive operation, reduce interruption, and improve the interactive experience in the process of sharing videos.

In other embodiments, after switching a target call interface to be displayed as a target sharing interface, the video sharing method can further include: when a second trigger operation in the target sharing interface is detected, in the target sharing interface, the first video is replaced with the third video selected by the second trigger operation; wherein, the third video is synchronously shared to the video of at least one second user.

Wherein, the second trigger operation may be a trigger operation used by the first user to switch the first video, and may specifically include, without limitations here, a gesture control operation (such as tap, long press, double tap, etc.), a voice control operation, or an expression control operation, etc., by the first user in the target sharing interface.

In these embodiments, the electronic device of the first user can detect the operation of the first user after switching the target call interface to be displayed as the target sharing interface, and when a second trigger operation of the first user in the target sharing interface is detected, the switching operation for the first video can be triggered. After that, the electronic device of the first user can display multiple candidate videos, and the first user may perform a choose operation among multiple candidate videos displayed, so that the electronic device of the first user will uses the candidate video chosen by the first user as a third video, and share the third video to an electronic device of at least one second user through a server, so that the electronic device of the first user and the electronic device of the second user both switch the first video displayed on the sharing interface to the second video.

The above sharing process of third video may include: the electronic device of the first user sends a sharing request to a server, the sharing request carrying information such as an video identification or a video address of the third video, and in responding to the sharing request, the server searches for a third video data stream of the third video stored locally based on the information such as the video identification or the video address of the third video, and pushes the third video data stream to the electronic device of the second user, so that the electronic device of the second user receives the third video data stream of the third video.

Figure 7:
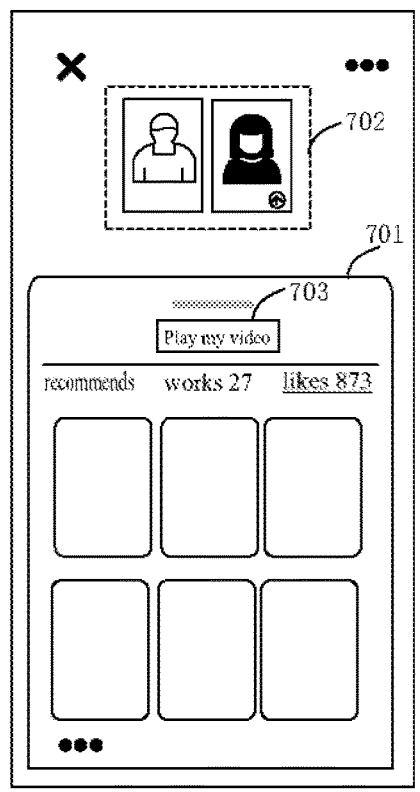
FIG. 7 is a schematic diagram of a fourth sharing interface provided by an embodiment of the disclosure.

Illustratively, FIG. 7 shows a schematic diagram of a fourth sharing interface provided by an embodiment of the present disclosure. Referring to FIG. 4 and FIG. 7, after the first user performs a trigger operation on a preset control 405 in FIG. 4, a video selection interface 701 in FIG. 7 can be shown in a target sharing interface, and the first user can use the chosen candidate video as a third video by performing a choose operation in the video selection interface 701. As shown in FIG. 7, the video selection interface 701 may include three types of candidate videos, such as recommended videos, own works, and favorite videos as shown in the figure. Each type may include multiple candidate videos. A call control 702 is also shown in FIG. 7.

Optionally, the first user can also view the first video currently being displayed on the sharing interface by a trigger operation on the control 703 for "play my video" in FIG. 7.

Therefore, in an embodiment of the present disclosure, when multiple users in a real-time call are watching a shared video synchronously, any user can trigger to switch the currently displayed video, and use the chosen video to replace the video currently being shared by other users, so that multiple users can watch another new video synchronously, which further improves the experience of video sharing.

In still another embodiment of the present disclosure, after switching a target call interface to be displayed as a target sharing interface, the electronic device of the first user may also display the target interactive result corresponding to a first interactive operation of a first user, but keep displaying the first video when a second user performs a second interactive operation.

In some embodiments, after switching a target call interface to be displayed as a target sharing interface, the video sharing method can further include: when a first interactive operation on a first video is detected, displaying the target interactive result corresponding to the first interactive operation in the target sharing interface; and/or, when the first interactive operation on the first video is detected, displaying the target interactive result corresponding to the first interactive operation and the first video targeted by the first interactive operation in the target sharing interface.

Wherein, the first interactive operation may be an operation such as like, forward, and comment on the first video currently being displayed in the target sharing interface by the first user. The target interactive result may be a result corresponding to the first interactive operation in the target sharing interface. For example, when the first interactive operation is a like, the target interactive result may be a change in the state of a like control, and when the first interactive operation is a comment, the target interactive result may be to display the content of the comment in a comment area.

Specifically, after switching a target call interface to be displayed as a target sharing interface, an electronic device of a first user can detect an operation of the first user. When a first interactive operation of the first user on a first video is detected, the target interactive result corresponding to the first interactive operation can displayed in the target sharing interface.

Optionally, when an television device of a first user detects a first interactive operation of the first user on a first video, and if, in the process of the first interactive operation, a second user performs a second interactive operation on the first video, the target interactive result of the first interactive operation and the first video targeted by the first interactive operation can be kept displayed in a target sharing interface. Optionally, when the television device of the first user detects the first interactive operation of the first user on the first video, and if, in the process of the first interactive operation, a second video data stream of the second video is received, then after displaying the target interactive result of the first interactive operation and the first video targeted by the first interactive operation in the target sharing interface, the first video is replaced with the second video.

In other embodiments, after a target call interface is switched to be displayed as a target sharing interface, the video sharing method can further include: in the case that the second user performs a second interactive operation on a first video, keep displaying the first video in the target sharing interface.

Wherein, the second interactive operation may be an operation such as like, forward, and comment on the first video currently being displayed by the second user, and the second interactive operation and the above-mentioned first interactive operation are implemented by corresponding electronic devices respectively. Specifically, after the electronic device of the first user switches the target call interface to be displayed as the target sharing interface, the electronic device of the second user may also switch the call interface to the shared interface and detect operation of the second user, and when a second interactive operation of the second user on the first video is detected, the interactive result corresponding to the second interactive operation can be displayed in the sharing interface of the second user, but the interactive result corresponding to the second interactive operation is not displayed in the target sharing interface of the first user, instead, the first video is kept to be displayed.

Specifically, after an electronic device of a second user receives a first interactive data of a first video sent by a server and displays it on an interactive control in a control layer, it detects interactive operations such as like, forward, and comment on the first video by the second user, and displays an interface corresponding to the interactive operation on the control layer, while a video layer still keeps displaying a video corresponding to the interactive operation.

Therefore, in an embodiment of the present disclosure, when multiple users who are in real-time call are watching a shared video synchronously, each user can only see the result of their own interactive operation, and cannot see results of other users' interactive operations, that is, interactive operations between different users are not shared, so that users' privacy is protected, thereby improving user's interactive experience.

In still another embodiment of the present disclosure, after an electronic device of a first user switches a target call interface to be displayed as a target sharing interface, the user can realize switching and displaying between the target call interface and the target sharing interface through a target control.

Optionally, after switching a target call interface to be displayed as a target sharing interface, the video sharing method can further include: when a third trigger operation in the target sharing interface is detected, returning to display the target call interface, and a target control is displayed in the target call interface; when a fourth trigger operation on the target control is detected, returning to display the target sharing interface.

Wherein, the third trigger operation may be a trigger operation of the first user on own call window in the target sharing interface, and the specific trigger operation form is not limited. The target control may be a functional control set in the target call interface for returning to the target sharing interface, and the position, size, and display content of the target control can be set as desired.

Specifically, after switching a target call interface to be displayed as a target sharing interface, an electronic device of a first user can detect an operation of the first user, and can return to display the target call interface after detecting a third trigger operation of the first user in the target sharing interface, and display a target control in the target call interface. After that, the electronic device of the first user can return to display the target sharing interface again when it detects a fourth trigger operation of the first user on the target control displayed in the target call interface.

Figure 8:
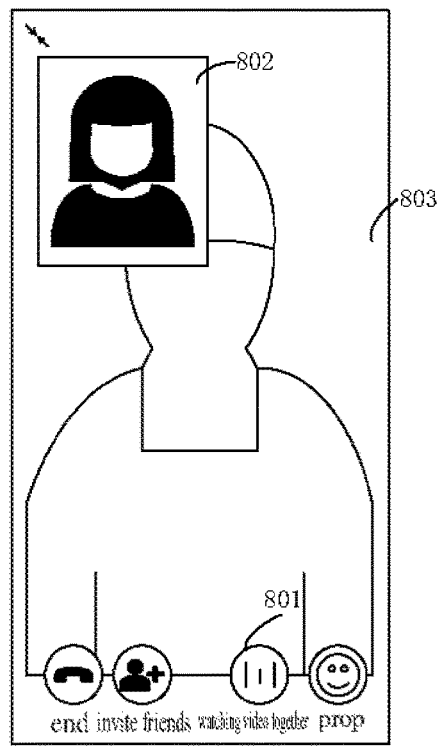
FIG. 8 is a schematic diagram of another call interface provided by an embodiment of the disclosure.
Figure 9:
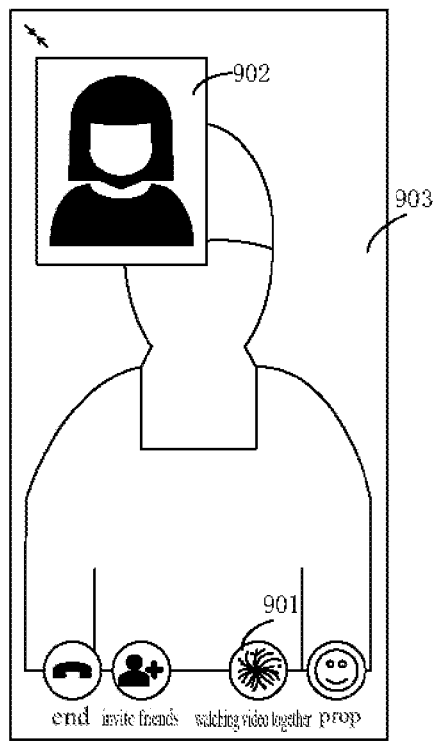
FIG. 9 is a schematic diagram of still another call interface provided by an embodiment of the present disclosure.
Figure 10:
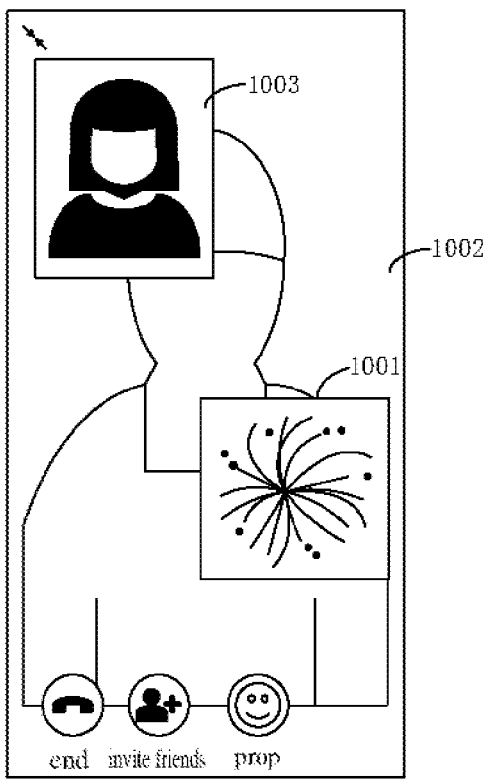
FIG. 10 is a schematic diagram of yet another call interface provided by an embodiment of the present disclosure.

Illustratively, FIG. 8 shows a schematic diagram of another call interface provided by an embodiment of the present disclosure. This call interface can display a real-time picture 802 of a first user and a real-time picture 803 of a second user who are in a real-time video call. FIG. 9 shows a schematic diagram of still another call interface provided by an embodiment of the present disclosure. This call interface can display a real-time picture 902 of a first user and a real-time picture 903 of a second user who are in a real-time video call. FIG. 10 shows a schematic diagram of yet another call interface provided by an embodiment of the present disclosure. The call interface can display a real-time picture 1002 of a first user and a real-time picture 1003 of a second user who are in a real-time video call.

Referring to FIG. 8, FIG. 9, and FIG. 10, three different target controls are illustrated, respectively. The target control can be a preset icon used to characterize video sharing states. The target control 801 in FIG. 8 is one simple icon used to indicate the state of "watching video together"; the target control can also be a preset window used to play a shared first video. The preset window can be displayed in the form of an icon, and its size is not limited. The target control 901 in FIG. 9 can be an icon that displays a first video being watched together. The target control in FIG. 10 1001 may be a small video window, which can display a first video being watched, and its position is different from that in FIG. 9. The target controls shown above are only meant to be examples, not limitations.

Optionally, after the electronic device of the first user returns to display the target call interface, the first user can add special effects by a trigger operation on a prop control, for example, special effects such as filters and makeup can be added.

Therefore, in an embodiment of the present disclosure, when multiple users who are in a real-time call are synchronously watching a shared video, each user can return to the call interface of the real-time call, and one control that can return to the sharing interface again can be displayed in the call interface, through which it can return to the sharing interface again from the call interface, thereby improving the interface switching experience of users.

The present disclosure also provides another video sharing method. In this video sharing method, after switching a target call interface to be displayed as a target sharing interface, an electronic device of a first user can also control a call control in the target sharing interface based on a trigger operation of the first user. This will be explained with reference to FIG. 11 below.

Figure 11:
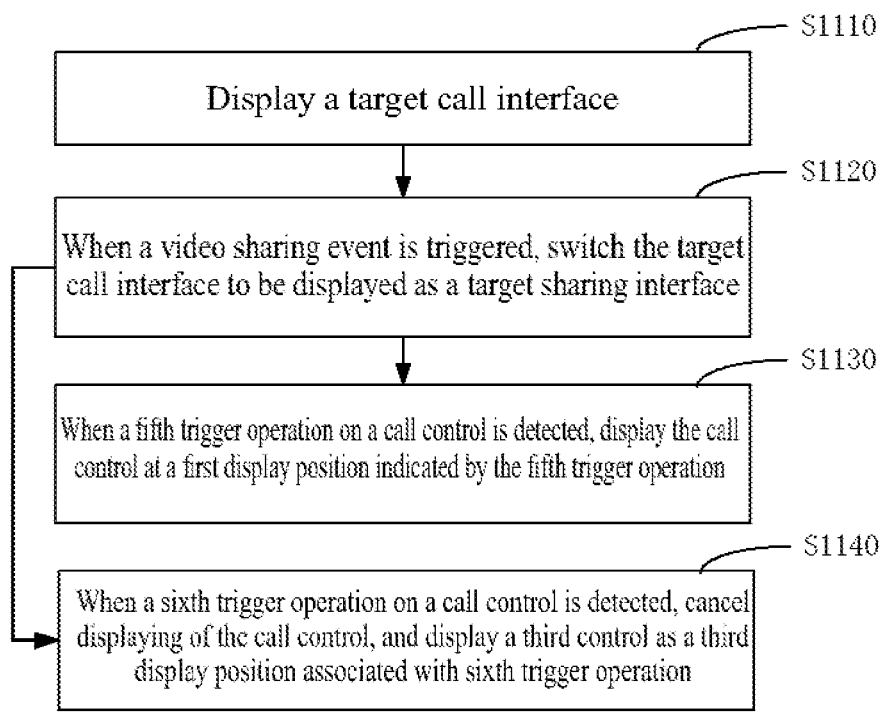
FIG. 11 is a schematic flowchart of another video sharing method provided by an embodiment of the present disclosure.

FIG. 11 shows a schematic flowchart of another video sharing method provided by an embodiment of the present disclosure.

As shown in FIG. 11, the video sharing method may include following steps.

S1110: Display a target call interface.

Wherein, the target call interface is used to make a real-time call between the first user and at least one second user.

S1120: When a video sharing event is triggered, switch the target call interface to be displayed as a target sharing interface.

Wherein, the target sharing interface is used to display a first video shared between the first user and the at least one second user and to keep the real-time call between the first user and the at least one second user.

It should be noted that S1110-S1120 are similar to S210-S220 shown in FIG. 2 and will not be repeated here.

After S1120, S1130 and/or S1140 can be included.

S1130: When a fifth trigger operation on a call control is detected, display the call control at a first display position indicated by the fifth trigger operation.

Wherein, the fifth trigger operation can be a drag operation on the call control in the target sharing interface. During the fifth trigger operation on the call control, the first display position can be a real-time position of the drag operation on the call control.

Specifically, an electronic device of the first user can detect an operation of the first user, and when the fifth trigger operation of the first user on the call control is detected, the call control can be moved from initial position to the first display position indicated by the fifth trigger operation in the target sharing interface.

In some embodiments, after the fifth trigger operation on the call control is detected, when the fifth trigger operation is detected to be ended, the call control can be displayed at the first display position, that is, the end position of the fifth trigger operation.

In some other embodiments, after the fifth trigger operation on the call control is detected, when the fifth trigger operation is detected to be ended, in the case that the first display position, that is, the end position of the fifth trigger operation, is located outside of a preset display area, the call control is bounced back to a second display position in the preset display area for display.

Wherein, the preset display area may be a display area other than the prohibited area in the target sharing interface, which can be specifically set as required. For example, the preset display area may be a display area other than the prohibited areas at the top and bottom. Optionally, the above prohibited areas can be set whether to be displayed as required. If the prohibited areas are highlighted, the first user can intuitively know which areas in the interface cannot place the call control. The second display position may be a display position corresponding to the first display position. For example, the second display position may be a position closest to the first display position in the preset display area.

Specifically, when the electronic device of the first user detects that the fifth trigger operation of the first user on the call control ends, and the first display position is outside the preset display area, the call control can be rebound from the first display position to the second display position within the preset display area for display, that is, the call control does not support moving to outside of the preset area. If the first user drags the call control to the area, it can automatically bounce back to the preset area.

Figure 12:
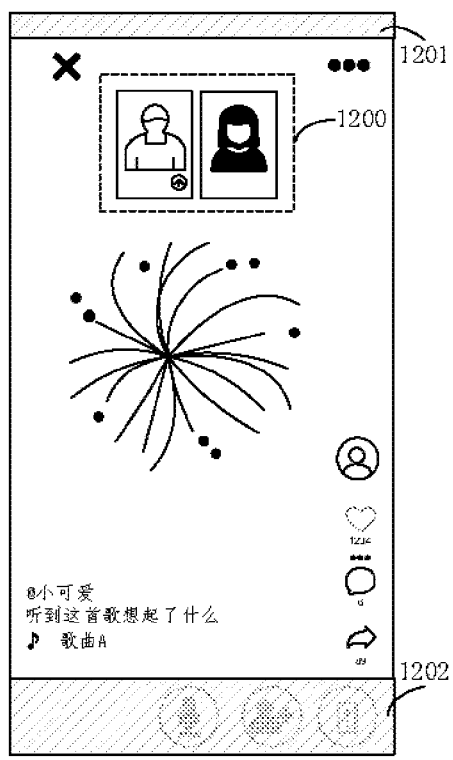
FIG. 12 is a schematic diagram of a fifth sharing interface provided by an embodiment of the present disclosure.

Illustratively, FIG. 12 shows a schematic diagram of a fifth sharing interface provided by an embodiment of the present disclosure. As shown in FIG. 12, a first user can drag a call control 1200 to move it to another location. The area 1201 filled with diagonal lines at the top and the area 1202 filled with diagonal lines at the bottom of the sharing interface in the figure are prohibited areas. When the first user drags the call control 1200 into the prohibited areas, an electronic device of the first user can rebound the call control 1200 to a preset display area, and the position of the rebound can be set as desired. For example, it can rebound to near cross-lines with the forbidden areas within the preset display area, and align with the cross-lines.

S1140: When a sixth trigger operation on a call control is detected, cancel displaying of the call control, and display a third control at a third display position associated with the sixth trigger operation.

Wherein, the sixth trigger operation may be an operation of the first user to drag the call control out of the side border of any side of the target sharing interface, and the area where the call control is dragged out of the interface is larger than the preset area.

The third control can be used to indicate that the call control is in a minimized state. The third control can display the user avatar of the user that the target call window in the call control belongs to, and the target call window is the call window for the user who is sharing a video; alternatively, the third control can also be a minimized icon, which is only used for characterization of the call control, and does not display user's relevant information.

Specifically, after detecting a sixth trigger operation of a first user on a call control, an electronic device of the first user can cancel displaying of the call control, and display a third control representing that the call control is in a minimized state at a third display position associated with the sixth trigger operation, that is, the call control can be collapsed into a third control with minimized state in the third display position. Optionally, the user avatar of the user who is currently sharing a video can be displayed in the third control.

Figure 13:
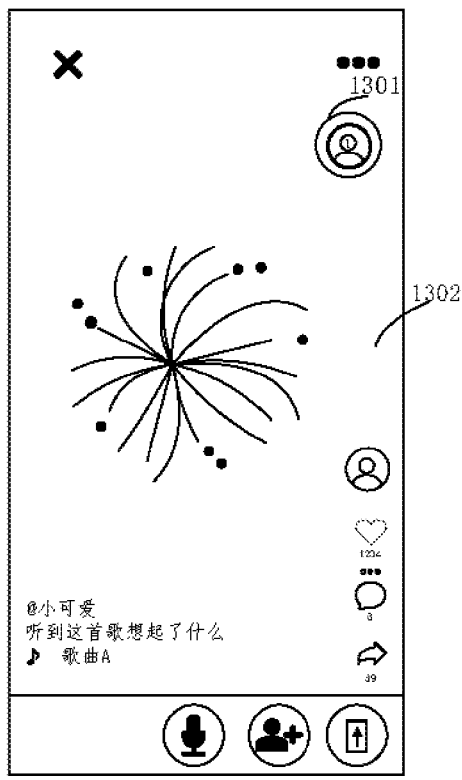
FIG. 13 is a schematic diagram of a sixth sharing interface provided by an embodiment of the present disclosure.

Illustratively, FIG. 13 shows a schematic diagram of a sixth sharing interface provided by an embodiment of the present disclosure. As shown in FIG. 13, the figure shows currently shared first video 1302 and a third control 1301, and display of the call control is cancelled. The third control 1301 is displayed at a position near a side border of the sharing interface, and the side border may be a side border corresponding to the drag operation of the user. In addition, the third control 1301 also displays the user avatar of the user who is currently sharing a video.

Therefore, in an embodiment of the present disclosure, when multiple users who are in real-time call are watching the shared video synchronously, each user can drag and drop the call control in the sharing interface to move it to a desired position in the allowed area, and cancel displaying of the call control when the part of the call control dragged out of the sharing interface reaches the limit, and a small control is displayed in the form of a small window, which further satisfies the user's need to control the call control, and improves the display flexibility of the call control, which further improves the user's experience of real-time call and video sharing.

An embodiment of the present disclosure also provides a video sharing apparatus, which is described below with reference to FIG. 14.

In an embodiment of the present disclosure, the video sharing apparatus can be an electronic device, for example, the electronic device can be the electronic device 101 or the electronic device 103 in the client shown in FIG. 1. Where, the electronic device can be a device with communication function, such as a mobile phone, a tablet, a desktop computer, a notebook, a vehicle-mounted terminal, a wearable device, an all-in-one machine, a smart home appliance, and the like.

Figure 14:
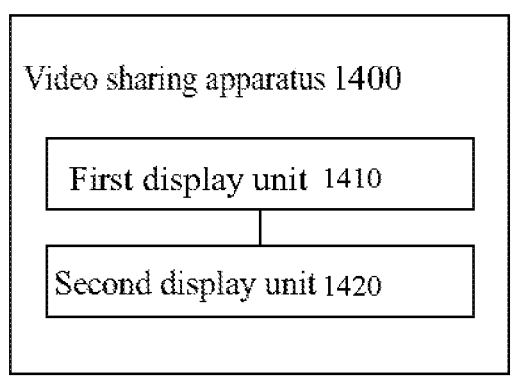
FIG. 14 is a schematic structural diagram of a video sharing apparatus provided by an embodiment of the present disclosure.

FIG. 14 shows a schematic structural diagram of a video sharing apparatus provided by an embodiment of the present disclosure.

As shown in FIG. 14, a video sharing apparatus 1400 is used for an electronic device of a first user, and may include a first display unit 1410 and a second display unit 1420.

The first display unit 1410 is configured to display a target call interface, where the target call interface is used by the first user to make a real-time call with at least one second user;

The second display unit 1420 is configured to switch the target call interface to be displayed as the target sharing interface when a video sharing event is triggered, the target sharing interface being used to display a first video shared between the first user and the at least one second user and to keep the real-time call between the first user and at least one second user.

In an embodiment of the present disclosure, a target call interface can be replaced with a target sharing interface when a video sharing event is triggered during a real-time call between a first user and a second user, so that the target sharing interface can be used to display a first video shared between the first user and at least one second user, so that the first user and the second user can watch the first video synchronously, so as to realize the sharing of the first video, and the target sharing interface can also be used to maintain the real-time call between the first user and the at least one second user, and can still communicate their own viewing experience in real time while simultaneously watching the first video, so as to make the first user and the second user have the experience of watching the first video face to face, which improves the user's experience of real-time call and video sharing.

In some embodiments of the present disclosure, the second display unit 1420 can be configured to trigger a video sharing event when a first trigger operation on a target call interface is detected;

Wherein, the first video is a video shared by a first user to at least one second user.

In some embodiments of the present disclosure, the second display unit 1420 can also be configured to trigger a video sharing event when a first video data stream of the first video is received;

Wherein, the first video is a video shared by the second user to the first user.

In some embodiments of the present disclosure, a video screen synchronized with the electronic device of the second user is displayed in the target sharing interface.

In some embodiments of the present disclosure, the video sharing apparatus 1400 can further include a first video replacement unit.

The first video replacement unit can be configured to, after the target call interface is switched to be displayed as the target sharing interface, replace the first video with a second video when a second video data stream of the second video is received;

Wherein, the second video is a video shared by the second user to the first user during the process of displaying the first video in the target sharing interface.

In some embodiments of the present disclosure, the video sharing apparatus 1400 can further include a second video replacement unit.

The second video replacement unit can be configured to, after switching the target call interface to be displayed as the target sharing interface, replace the first video with a third video chosen by a second trigger operation in the target sharing interface when the second trigger operation in the target sharing interface is detected;

Wherein, the third video is synchronously shared to the video of at least one second user.

In some embodiments of the present disclosure, the video sharing apparatus 1400 can further include a first interaction unit.

The first interaction unit can be configured to, after switching the target call interface to be displayed as the target sharing interface, display the target interactive result corresponding to a first interactive operation in the target sharing interface when the first interactive operation on the first video is detected; and/or When the first interactive operation on the first video is detected, display the target interactive result corresponding to the first interactive operation and the first video targeted by the first interactive operation in the target sharing interface.

In some embodiments of the present disclosure, the video sharing apparatus 1400 can further include a second interaction unit.

The second interaction unit can be configured to, after switching the target call interface to be displayed as the target sharing interface, in the case that the second user performs a second interactive operation on the first video, keep displaying the first video in the target sharing interface.

In some embodiments of the present disclosure, the video sharing apparatus 1400 can further include an interface switching unit.

The interface switching unit can be configured to, after switching the target call interface to be displayed as the target sharing interface, return to display the target call interface when a third trigger operation on the target sharing interface is detected, and a target control is displayed in the target call interface;

When a fourth trigger operation on the target control is detected, return to display the target sharing interface.

In some embodiments of the present disclosure, the target sharing interface is also used to display call controls, and the call controls include a call window for a first user and a call window for a second user.

In some embodiments of the present disclosure, the display size of a call control is determined according to the number of call windows in the call control, and/or the number of call windows is determined according to the number of real-time call users.

In some embodiments of the present disclosure, a sharing mark is displayed on a target call window in a call control, and the target call window is the call window for a user who is sharing a video.

In some embodiments of the present disclosure, the video sharing apparatus 1400 can further include a first control control unit.

The first control control unit can be configured to, after switching a target call interface to be displayed as a target sharing interface, display a call control at a first display position indicated by a fifth trigger operation when the fifth trigger operation on the call control is detected.

In some embodiments of the present disclosure, the video sharing apparatus 1400 can further include a second control control unit.

The second control control unit can be configured to, after a fifth trigger operation on a call control is detected, When the end of the fifth trigger operation is detected, in the case that the first display position is outside a preset display area, the call control is bounced back to a second display position within the preset display area for display, and the second display position is a display position corresponding to the first display position.

In some embodiments of the present disclosure, the video sharing apparatus 1400 can further include a third control control unit.

The third control control unit can be configured to, after switching a target call interface to be displayed as a target sharing interface, When a sixth trigger operation on a call control is detected, cancel displaying of the call control;

A third control is displayed at a third display position associated with a sixth trigger operation, and the third control is used to indicate that the call control is in a minimized state.

In some embodiments of the present disclosure, a user avatar of the user to which a target call window in the call control belongs is displayed in the third control, and the target call window is the call window for the user who is sharing a video.

It should be noted that the video sharing apparatus 1400 shown in FIG. 14 can execute each step in the method embodiments shown in FIG. 2 to FIG. 13, and implement each process and effect in the method embodiments shown in FIG. 2 to FIG. 13, which will not repeat here.

An embodiment of the present disclosure also provide an electronic device, which can include a processor and a memory, and the memory can be used to store an executable instruction. Wherein, the processor can be used to read the executable instruction from the memory, and execute the executable instruction to implement the video sharing methods in the foregoing embodiments.

Figure 15:
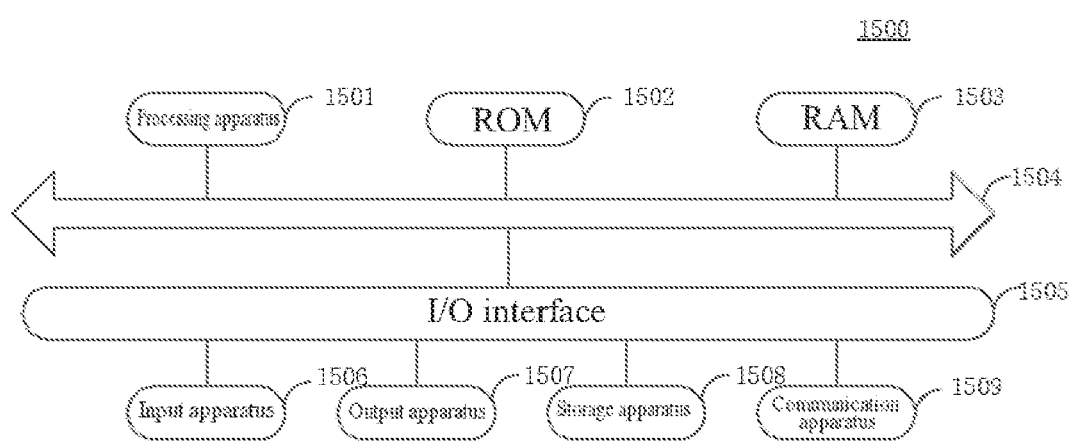
FIG. 15 is a schematic structural diagram of an electronic device provided by an embodiment of the disclosure.

FIG. 15 shows a schematic structural diagram of an electronic device provided by an embodiment of the present disclosure. Referring specifically to FIG. 15 below, it shows a schematic structural diagram suitable for implementing an electronic device 1500 in an embodiment of the present disclosure.

The electronic device 1500 in the embodiment of the present disclosure can be the electronic device 101 or the electronic device 103 in the client shown in FIG. 1. Wherein, the electronic device may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), a wearable device, etc. and a fixed terminal such as a digital TV, a desktop computer, a smart home device, etc.

It should be noted that the electronic device 1500 shown in FIG. 15 is only one example, and should not bring any limitation to functions and usage scopes of the embodiments of the present disclosure.

As shown in FIG. 15, the electronic device 1500 may include a processing apparatus (for example a central processing unit, a graphics processor, etc.) 1501, which can execute various appropriate actions and processes according to a program stored in a read-only memory (ROM) 1502 or a program loaded from a storage apparatus 1508 into a random access memory (RAM) 1503. In the RAM 1503, various programs and data required for the operation of the information processing device 1500 are also stored. The processing apparatus 1501, ROM 1502, and RAM 1503 are connected to each other through a bus 1504. An input/output (I/O) interface 1505 is also connected to the bus 1504.

Generally, the following apparatus can be connected to the I/O interface 1505: an input device 1506 including for example, a touch screen, a touch pad, a keyboard, a mouse, a camera, a microphone, an accelerometer, a gyroscope, etc.; an output device 1507 including for example, a liquid crystal display (LCD), a speaker, a vibrator, etc.; a storage apparatus 1508 including for example, a magnetic tape, a hard disk, etc.; and a communication apparatus 1509. The communication apparatus 1509 may allow the electronic device 1500 to perform wireless or wired communication with other devices to exchange data. Although FIG. 15 shows an electronic device 1500 having various apparatus, it should be understood that it is not required to implement or have all of the illustrated apparatus. It can alternatively be implemented or provided with more or fewer apparatus.

An embodiment of the present disclosure also provides a computer-readable storage medium having a computer program stored thereon, which, when executed by a processor, causes the processor to implement the video sharing method in the embodiments described above.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program may be downloaded and installed from the network through the communication apparatus 1509, or installed from the storage apparatus 1508, or installed from the ROM 1502. When the computer program is executed by the processing apparatus 1501, the above-mentioned functions defined in the video sharing method of the embodiments of the present disclosure are executed.

It should be noted that the aforementioned computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, the client and server can communicate with any currently known or future developed network protocol such as HTTP, and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The aforementioned computer-readable medium may be included in aforementioned electronic devices; or it may exist alone without being assembled into the electronic device.

The aforementioned computer-readable medium carries one or more programs, which, when executed by the electronic device, cause the electronic device to perform:
displaying a target call interface, which is used to make a real-time call between a first user and at least one second user;
when a video sharing event is triggered, the target call interface is switched to be displayed as a target sharing interface, the target sharing interface being used to display a first video shared between the first user and the at least one second user and to keep the real-time call between the first user and the at least one second user.

In an embodiment of the present disclosure, the computer program code for performing the operations of the present disclosure can be written in one or more programming languages or a combination thereof. The aforementioned programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The units involved in the embodiments of the present disclosure can be implemented in software or hardware. Wherein, the name of the unit does not constitute a limitation on the unit itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims.

What is claimed is:

1. A media content sharing method, used for an electronic device of a first user, comprises:

displaying a target call interface, the target call interface being used to make a real-time call between the first user and at least one second user;

in response to a media content sharing event being triggered, switching the target call interface to display a target sharing interface, the target sharing interface displaying a first media content shared between the first user and the at least one second user, along with a call control, and maintaining the real-time call between the first user and the at least one second user; and in response to a minimizing operation on the call control, canceling display of the call control, and displaying a minimized call control, which indicates that the call control is in a minimized state, wherein, the in response to a minimizing operation on the call control, canceling display of the call control, and displaying a minimized call control, comprises: in response to dragging the call control out of a side border of the target sharing interface until a predetermined condition is met, canceling the display of the call control, and displaying the minimized call control at a minimized display position that is associated with the minimizing operation, and wherein, a user avatar of the user who is sharing the first media content is displayed within the minimized call control.

2. The method according to claim 1, wherein the media content sharing event being triggered comprises:

in response to a first trigger operation on the target call interface being detected, the media content sharing event is triggered;

wherein, the first media content is a media content shared by the first user to the at least one second user.

3. The method of claim 1, wherein the media content sharing event being triggered comprises:

in response to a first media content data stream of the first media content being received, the media content sharing event is triggered;

wherein, the first media content is a media content shared by the second user to the first user.

4. The method according to claim 1, wherein a media content screen synchronized with an electronic device of the second user is displayed in the target sharing interface.

5. The method according to claim 1, wherein, after said switching the target call interface to display a target sharing interface, the method further comprises:

in response to a second media content data stream of the second media content being received, the first media content is replaced with the second media content;

wherein, the second media content is a media content shared by the second user to the first user during the process of displaying the first media content in the target sharing interface.

6. The method according to claim 1, wherein, after said switching the target call interface to display a target sharing interface, the method further comprises:

in response to a second trigger operation in the target sharing interface being detected, in the target sharing interface, the first media content is replaced with a third media content chosen by the second trigger operation;

wherein, the third media content is synchronously shared to the at least one second user.

7. The method according to claim 1, wherein, after said switching the target call interface to display a target sharing interface, the method further comprises:

in response to a first interactive operation on the first media content being detected, the target interactive result corresponding to the first interactive operation is displayed in the target sharing interface; and/or, in response to a first interactive operation on the first media content being detected, the target interactive result corresponding to the first interactive operation and the first media content targeted by the first interactive operation are displayed in the target sharing interface.

8. The method according to claim 1, wherein, after said switching the target call interface to display a target sharing interface, the method further comprises:

in a case that the second user performs a target interactive operation on the first media content, the first media content is kept displayed in the target sharing interface.

9. The method according to claim 1, wherein, after said switching the target call interface to display a target sharing interface, the method further comprises:

in response to a third trigger operation on the target sharing interface being detected, returning to display the target call interface, a target control being displayed in the target call interface; and in response to a fourth trigger operation on the target control being detected, returning to display the target sharing interface.

10. The method according to claim 1, wherein the call control including a call window for the first user and a call window for the second user.

11. The method according to claim 10, wherein a display size of the call control is determined according to a number of call windows in the call control, and/or the number of call windows is determined according to a number of users in the real-time call.

12. The method according to claim 10, wherein a sharing mark is displayed on a target call window in the call control, the target call window being a call window of a user who is sharing a media content.

13. The method according to claim 10, wherein, after said switching the target call interface to display a target sharing interface, the method further comprises:

in response to a fifth trigger operation on the call control being detected, the call control is displayed at a first display position indicated by the fifth trigger operation.

14. The method according to claim 13, wherein, after said a fifth trigger operation on the call control being detected, the method further comprises:

in response to an end of the fifth trigger operation being detected, in the case that the first display position is outside a preset display area, the call control is bounced back to a second display position within the preset display area, the second display position being a display position corresponding to the first display position.

15. The method according to claim 1, wherein, the predetermined condition comprises:

the portion of the call control that has been dragged outside the target sharing interface reaching a preset limit.

16. The method according to claim 1, wherein, after said switching the target call interface to display a target sharing interface, the method further comprises:

in response to a first interactive operation on the first media content performed by the first user being detected, a first target interactive result corresponding to the first interactive operation is displayed in the target sharing interface of the first user, and the first target interactive result and a second target interactive result are independent from each other, wherein the second target interactive result corresponds to a second interactive operation performed by the second user on the first media content and the second target interactive result is displayed on a sharing interface of the second user such that interactive data corresponding to the first user and interactive data corresponding to the second user are acquired separately according to interaction operations on the first media content respectively by the first user and the second user.

17. An electronic device, comprising:
a processor; and
a memory configured to store an executable instruction;
wherein, the processor is configured to read the executable instruction from the memory, and execute the executable instruction to implement the media content sharing method according to claim 1.

18. A non-transitory computer-readable storage medium, wherein the storage medium stores a computer program, which, when executed by a processor, causes the processor to implement the media content sharing method according to claim 1.

* * * * *